March 6, 1951     E. D. MITCHELL     2,544,171
AUTOMATIC COW STANCHION DEVICE
Filed Dec. 16, 1949
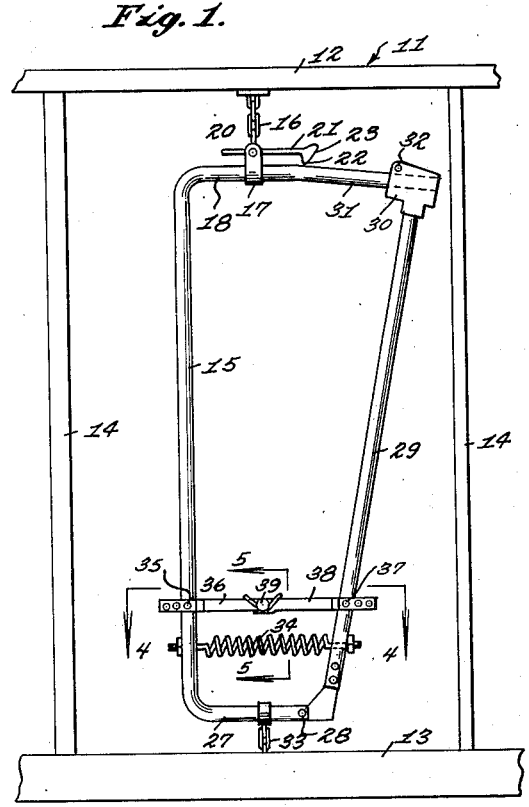
Fig. 1.
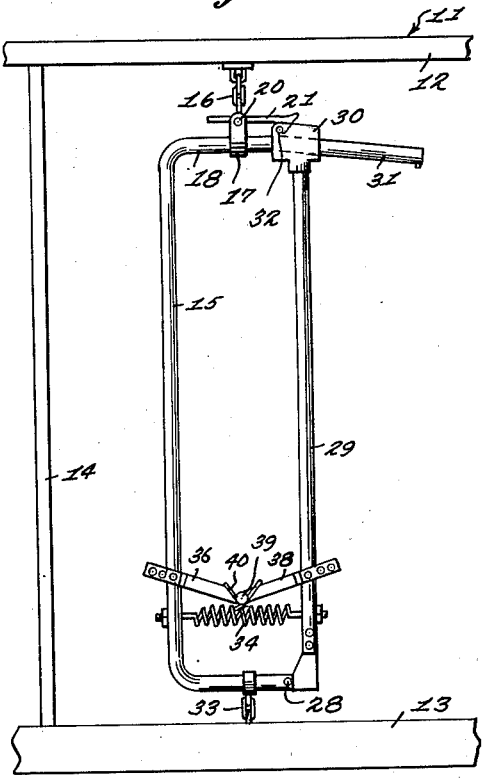
Fig. 2.
Fig. 3.
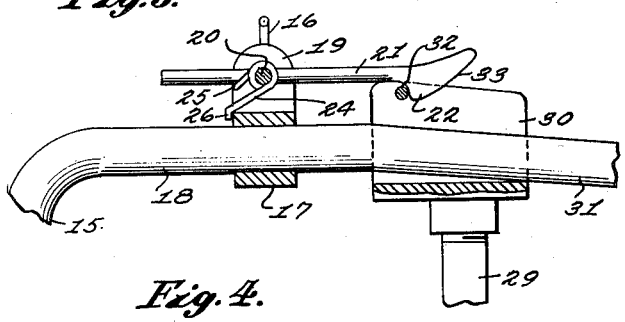
Fig. 6.
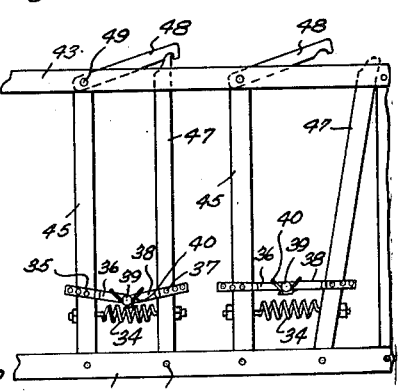
Fig. 4.
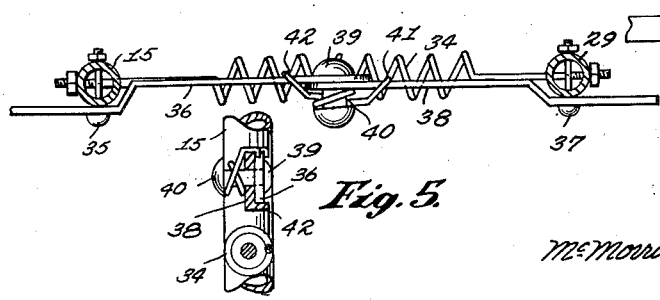
Fig. 5.
INVENTOR.
EDGAR D. MITCHELL
BY
McMorrow, Berman & Davidson
ATTORNEYS Patented Mar. 6, 1951

2,544,171

UNITED STATES PATENT OFFICE 2,544,171

AUTOMATIC COW STANCHION DEVICE

Edgar D. Mitchell, Taos, N. Mex.

Application December 16, 1949, Serial No. 133,309

3 Claims. (Cl. 119—147)

1

This invention relates to cattle stanchions, and more particularly to a cattle stanchion of the type which will automatically lock cattle in their respective stalls.

A main object of the invention is to provide a novel and improved cow stanchion adapted to be placed in front of a feed trough and being arranged so that when the cow or other animal with which the device is employed attempts to eat from the trough, the stanchion will be automatically actuated to lock the animal in its stall until released by an attendant, the stanchion device being simple in construction, easy to install, and reliable in operation.

A further object of the invention is to provide an improved cattle stanchion device which is inexpensive to manufacture, which involves only a few parts, and which is easy to reset.

Further objects and advantages of the invention will become apparent from the following description and claims, and from the accompanying drawings, wherein:

Figure 1 is a front elevational view of an improved cow stanchion device constructed in accordance with the present invention, shown mounted in a stall, and shown in open position;

Figure 2 is a view similar to Figure 1, but showing the stanchion device in locked position;

Figure 3 is an enlarged, longitudinal, cross-sectional, detail view taken through the detent portion of the stanchion device of Figures 1 and 2;

Figure 4 is an enlarged, cross-sectional detail view taken on line 4—4 of Figure 1;

Figure 5 is an enlarged, cross-sectional, detail view taken on line 5—5 of Figure 1;

Figure 6 is a front elevational view showing modified stanchion devices constructed in accordance with the present invention.

Referring to the drawings, and more particularly to Figures 1 to 5, the numeral 11 generally designates the forward portion of a cattle stall, said forward portion comprising a horizontal top bar 12, a bottom bar 13, and vertical side bars 14, 14 connecting the top and bottom bars. Designated at 15 is a C-shaped yoke member supported from the top bar 12 by a chain 16 which is secured to a bracket member 17 fastened to the top arm 18 of the yoke member 15, as shown in Figure 3. Bracket member 17 has spaced, upper fingers 19 through which extends a transverse pin 20 on which is pivotally mounted a latch arm 21 formed with a depending detent portion 22 at its forward end, said detent portion having an arcuately curved cam surface 23. Latch arm 21 is biased clockwise, as viewed in Figure 3, by a coil

2 spring 24 which encircles pin 20 and has one end engaging beneath arm 21 at 25 and the other arm engaging the bracket 17 at 26. Pivotally secured to the end of the lower arm 27 of the yoke member 15 at 28 is an upwardly extending arm 29 provided at its top end with a U-shaped bracket member 30 which receives the forward end of the top arm 18. Said forward end, shown at 31, is inclined downwardly with respect to the main portion of the top arm 18. Secured between the walls of the bracket member 30 is a transverse pin 32 arranged to cooperate with the detent 22 in the manner shown in Figure 3 to lock the arm 29 in vertical closed position, as shown in Figure 2.

The lower arm 27 of yoke member 15 is connected to bottom bar 13 by a chain 33. Connecting the lower portion of the main vertical arm of yoke member 15 and the lower portion of the pivoted arm 29 is a coil spring 34. Spring 34 biases the arm 29 toward the closed position of Figure 2. Pivoted to the main vertical arm of yoke member 15 a short distance above spring 34 at 35 is an inwardly extending bar member 36, and pivoted to the arm 29 a short distance above the spring 34 at 37 is another bar member 38, the inner ends of the bar members 36 and 38 being pivotally connected together at 39. The pivot member 39 comprises a rivet around whose shank is wound a coil spring 40 having one end 41 bearing downwardly on the bar 38 and having its other end 42 bearing downwardly on the bar 36, as shown in Figure 4. Spring 40 biases the arms 36 and 38 toward horizontal, dead center positions, such as shown in Figure 1. In the dead center positions of the bars, shown in Figure 1, the force of spring 34 is insufficient to move the arm 29 toward the vertical, closed position thereof shown in Figure 2. However, when the inner, pivotally connected end portions of the bars 36 and 38 are depressed, for example, by contact with the neck of an animal when the animal lowers its head for feeding, the arms 36 and 38 are rotated downwardly away from their dead center positions, and the spring 34 then rotates the arm 29 toward its vertical, locked position. When this occurs, the pin 32 of bracket member 30 engages the curved camming surface 23 and slips past the detent element 22 into the position of Figure 3, whereby the arm 29 is locked in its vertical, closed position, thereby locking the animal in the stall. To release the animal, the latch arm 21 must be manually raised, whereby the arm 29 may be swung to the position of Figure 1, in which position the bars 36 and 38 are raised to their horizontal, dead center positions, thereby maintaining the arm 29 in its outwardly rotated, released position, shown in Figure 1, until the arms 36 and 38 are again rotated downwardly by contact with the neck of an animal.

The bar 38 is formed at its bottom edge with a horizontal flange 42 which underlies the bottom edge of the bar 36, as shown in Figure 5, and prevents the bar members 36 and 38 from being rotated upwardly beyond their horizontal, dead center positions.

In the embodiment of the invention shown in Figure 6, the stanchion devices are incorporated in a frame comprising an upper bar 43, a lower bar 44 and respective vertical bars 45 connecting the upper and lower bars 43 and 44. Pivoted to the lower bar 44 at 46, spaced from each vertical bar 45, is a swinging bar 47 whose top end is lockingly engageable with the notched end of an upper, swinging bar 48 pivoted to the top bar 43 at 49. The lower portions of bars 45 and 47 are connected by a spring 34 which biases the bar 47 toward its vertical, locking position, as shown at the left side of Figure 6, and pivoted to the respective bars 45 and 47 above the spring 34 are the respective bar members 36 and 38 pivotally connected at their inner ends at 39 and biased upwardly by a spring 40 in the same manner as in the embodiment of the invention shown in Figures 1 to 5. The structure of the bars 36 and 38 is similar to that in the previously described embodiment of the invention, and as shown at the right side of Figure 6, the spring 40 biases the bars 36 and 38 toward horizontal, dead center positions when the swinging bar 47 is in its opened position. When the pivotally connected inner end portions of the bar members 36 and 38 are depressed by contact with the neck of an animal, as in the previously described embodiment of the invention, the bar members 36 and 38 are rotated downwardly from their horizontal, dead center positions, and the spring 34 then rotates the bar member 47 inwardly toward its vertical, locking position, wherein the top end of the swinging bar member 47 lockingly engages the latch bar 48 and is secured in closed position until said latch bar 48 is manually lifted and the swinging bar 47 rotated outwardly to again raise the bar members 36 and 38 to their horizontal, dead center positions.

While certain specific embodiments of an improved cattle stanchion device have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A cattle stanchion comprising a pair of upstanding bars arranged in parallel space relation with respect to each other and connected together at one end for movement toward and away from each other, interengaging means on the other ends of said bars for detachably connecting said bars in their position of movement toward each other, spring means extending transversely of and between said bars adjacent to and spaced from said one end thereof and connected to said bars for urging the latter toward each other, a pair of links arranged in end to end line relation positioned above and in parallel space relation with respect to said spring means and each having the non-confronting end pivotally connected to the adjacent bar, means pivotally connecting the confronting ends of said links together, and a second spring means operatively connected to said means for urging said links into the aligned relation.

2. A cattle stanchion comprising a pair of upstanding bars arranged in parallel spaced relation and connected together at one end for movement toward and away from each other, interengaging means on the other ends of said bars for detachably connecting said bars in their position of movement toward each other, spring means extending transversely of and between said bars adjacent to and spaced from said one end thereof and connected to said bars for urging the latter toward each other, a pair of links arranged in end to end aligned relation positioned above and in parallel spaced relation with respect to said spring means and each having the non-confronting end pivotally connected to the adjacent bar, means pivotally connecting the confronting ends of said links together for up movement into aligned relation with respect to each other and for down movement out of aligned relation with respect to each other upon execution of the respective movements of said bars away from and toward each other, means operatively connected to said links for releasably holding said links in aligned relation to thereby retain said arms in their position of movement away from each other.

3. A cattle stanchion comprising a pair of upstanding bars arranged in parallel spaced relation and connected together at one end for movement toward and away from each other, interengaging means on the other ends of said bars for detachably connecting said bars in their position of movement toward each other, spring means extending transversely of and between said bars adjacent to and spaced from said one end thereof and connected to said bars for urging the latter toward each other, a pair of links arranged in end to end aligned relation positioned above and in parallel spaced relation with respect to said spring means and each having the non-confronting end pivotally connected to the adjacent bar, means pivotally connecting the confronting ends of said links together for up movement into aligned relation with respect to each other and for down movement out of aligned relation with respect to each other upon execution of the respective movements of said bars away from and toward each other, an abutment on one of said links adjacent the confronting end thereof and engageable with the adjacent portion of the other of said links upon movement of said links into aligned relation to prevent further upward movement of said links, means operatively connected to said links for urging said links upwardly into their aligned relation to thereby releasably hold said bars in their position of movement away from each other.

EDGAR D. MITCHELL.

REFERENCES CITED

The following references are of record in the file of this patent:

UNITED STATES PATENTS

| Number | Name | Date |
| --- | --- | --- |
| 640,954 | Rufi | Jan. 9, 1900 |
| 739,610 | Kueter | Sept. 22, 1903 |
| 918,613 | Upton | Apr. 20, 1909 |
| 1,071,136 | Boettcher | Aug. 26, 1913 |
| 1,146,315 | Eggars | July 13, 1915 |
| 1,201,451 | Falsey | Oct. 17, 1916 |